(12) United States Patent
Delaney et al.

(10) Patent No.: US 7,613,794 B2
(45) Date of Patent: Nov. 3, 2009

(54) IDENTIFYING DYNAMIC GROUPS

(75) Inventors: Shawn P. Delaney, San Jose, CA (US); Robert Summers, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/684,796

(22) Filed: Mar. 12, 2007

(65) Prior Publication Data
US 2007/0168530 A1 Jul. 19, 2007

Related U.S. Application Data

(63) Continuation of application No. 10/328,920, filed on Dec. 23, 2002, now Pat. No. 7,206,851.

(60) Provisional application No. 60/395,152, filed on Jul. 11, 2002.

(51) Int. Cl.
G06F 15/16 (2006.01)
G06F 17/30 (2006.01)

(52) U.S. Cl. .................. 709/219; 709/203; 709/229; 707/9; 707/3

(58) Field of Classification Search ............. 709/203, 709/219, 229; 707/9, 3
See application file for complete search history.

(56) References Cited

U.S. PATENT DOCUMENTS 5,010,478 A 4/1991 Deran (Continued)

OTHER PUBLICATIONS

Cooney, Michael, "IBM Rolls Out Host- And Server-Based Mgmt. Apps," Network World, vol. 12, Issue 6, pp. 6-7, Feb. 6, 1995.

(Continued)

*Primary Examiner*—Kevin Bates
(74) *Attorney, Agent, or Firm*—Townsend and Townsend and Crew LLP

(57) ABSTRACT

Technology is disclosed for identifying dynamic groups that correspond to a user of a system. A system partitions a set of dynamic groups into multiple test sets of dynamic groups. The system selects a test set and determines whether the user corresponds to the test set. In one implementation, the system combines the filters for the dynamic groups in each test set into a single test set filter. The test set filter is satisfied if the filter of any dynamic group in the test set is satisfied. This allows the system to perform a single comparison between the resulting test set filter and the user's profile to determine whether the user is a member of any dynamic group in the test set. If the user is not a member of any dynamic group in the test set, the system eliminates all of the test set's dynamic groups from consideration, based on the single comparison. Otherwise, the dynamic groups in the test set remain in a list of groups that may include the user. This process is repeated for each test set. After each test set has been evaluated, new test sets are repeatedly generated and evaluated in the above-described fashion using the dynamic groups that are still in consideration. In each iteration, each test set contains fewer dynamic groups. This continues until each test set only contains one dynamic group. After performing an iteration with each test set containing one dynamic group, the only remaining dynamic groups are the ones that include the user as a member.

76 Claims, 10 Drawing Sheets

U.S. PATENT DOCUMENTS

| | | |
|---|---|---|
| 5,077,666 A | 12/1991 | Brimm et al. |
| 5,455,953 A | 10/1995 | Russell |
| 5,499,371 A | 3/1996 | Henninger et al. |
| 5,530,861 A | 6/1996 | Diamant et al. |
| 5,581,691 A | 12/1996 | Hsu et al. |
| 5,596,746 A | 1/1997 | Shen et al. |
| 5,664,154 A | 9/1997 | Purcell et al. |
| 5,678,041 A | 10/1997 | Baker et al. |
| 5,692,125 A | 11/1997 | Schloss et al. |
| 5,694,598 A | 12/1997 | Durand et al. |
| 5,708,780 A | 1/1998 | Levergood et al. |
| 5,713,023 A | 1/1998 | Hayata et al. |
| 5,721,900 A | 2/1998 | Banning et al. |
| 5,724,595 A | 3/1998 | Gentner |
| 5,732,408 A | 3/1998 | Takahashi |
| 5,734,837 A | 3/1998 | Flores et al. |
| 5,754,939 A | 5/1998 | Herz et al. |
| 5,764,890 A | 6/1998 | Glasser et al. |
| 5,815,703 A | 9/1998 | Copeland et al. |
| 5,848,273 A | 12/1998 | Fontana et al. |
| 5,878,411 A | 3/1999 | Burroughs et al. |
| 5,944,824 A | 8/1999 | He |
| 5,991,810 A | 11/1999 | Shapiro et al. |
| 5,999,911 A | 12/1999 | Berg et al. |
| 6,014,666 A | 1/2000 | Helland et al. |
| 6,044,465 A | 3/2000 | Dutcher et al. |
| 6,073,109 A | 6/2000 | Flores et al. |
| 6,078,747 A | 6/2000 | Jewitt |
| 6,098,056 A | 8/2000 | Rusnak et al. |
| 6,131,120 A | 10/2000 | Reid |
| 6,134,634 A | 10/2000 | Marshall, Jr. et al. |
| 6,138,104 A | 10/2000 | Marchak et al. |
| 6,141,778 A | 10/2000 | Kane et al. |
| 6,145,003 A | 11/2000 | Sanu et al. |
| 6,151,531 A | 11/2000 | Frankel et al. |
| 6,158,010 A | 12/2000 | Moriconl et al. |
| 6,163,781 A | 12/2000 | Wess, Jr. |
| 6,182,142 B1 | 1/2001 | Win et al. |
| 6,195,710 B1 | 2/2001 | Borgendale et al. |
| 6,208,986 B1 | 3/2001 | Schneck et al. |
| 6,212,558 B1 | 4/2001 | Antur et al. |
| 6,253,202 B1 | 6/2001 | Gilmour |
| 6,253,239 B1 | 6/2001 | Shklar et al. |
| 6,253,257 B1 | 6/2001 | Dundon |
| 6,256,737 B1 | 7/2001 | Bianco et al. |
| 6,256,739 B1 | 7/2001 | Skopp et al. |
| 6,260,077 B1 | 7/2001 | Rangarajan et al. |
| 6,266,420 B1 | 7/2001 | Langford et al. |
| 6,278,993 B1 | 8/2001 | Kumar et al. |
| 6,279,043 B1 | 8/2001 | Hayward et al. |
| 6,314,470 B1 | 11/2001 | Ward et al. |
| 6,323,881 B1 | 11/2001 | Broulik |
| 6,335,927 B1 | 1/2002 | Elliott et al. |
| 6,338,097 B1 | 1/2002 | Krenzke et al. |
| 6,343,287 B1 | 1/2002 | Kumar et al. |
| 6,347,312 B1 | 2/2002 | Byrne et al. |
| 6,349,306 B1 | 2/2002 | Malik et al. |
| 6,353,929 B1 | 3/2002 | Houston |
| 6,366,913 B1 | 4/2002 | Fitler, Jr. et al. |
| 6,366,987 B1 | 4/2002 | Tzeinic et al. |
| 6,401,101 B1 | 6/2002 | Britton et al. |
| 6,401,138 B1 | 6/2002 | Judge et al. |
| 6,415,368 B1 | 7/2002 | Glance et al. |
| 6,434,531 B1 | 8/2002 | Lancelot et al. |
| 6,442,567 B1 | 8/2002 | Retallick et al. |
| 6,490,655 B1 | 12/2002 | Kershaw |
| 6,499,023 B1 | 12/2002 | Dong et al. |
| 6,523,022 B1 | 2/2003 | Hobbs |
| 6,529,941 B2 | 3/2003 | Haley et al. |
| 6,539,379 B1 | 3/2003 | Vora et al. |
| 6,549,941 B1 | 4/2003 | Jaquith et al. |
| 6,611,840 B1 | 8/2003 | Baer et al. |
| 6,647,383 B1 | 11/2003 | August et al. |
| 6,671,695 B2 | 12/2003 | McFadden |
| 6,671,745 B1 | 12/2003 | Mathur et al. |
| 6,701,368 B1 | 3/2004 | Chennapragada et al. |
| 6,704,807 B1 | 3/2004 | Mathur et al. |
| 6,704,873 B1 | 3/2004 | Underwood |
| 6,708,170 B1 | 3/2004 | Byrne et al. |
| 6,721,804 B1 | 4/2004 | Rubin et al. |
| 6,732,178 B1 | 5/2004 | Van Horne et al. |
| 6,732,179 B1 | 5/2004 | Brown et al. |
| 6,741,853 B1 | 5/2004 | Jiang et al. |
| 6,757,720 B1 | 6/2004 | Wechsler, Jr. |
| 6,760,750 B1 | 7/2004 | Boneh et al. |
| 6,768,988 B2 | 7/2004 | Boreham et al. |
| 6,769,000 B1 | 7/2004 | Akhtar et al. |
| 6,785,686 B2 | 8/2004 | Boreham et al. |
| 6,785,713 B1 | 8/2004 | Freeman et al. |
| 6,785,726 B1 | 8/2004 | Freeman et al. |
| 6,839,701 B1 | 1/2005 | Baer et al. |
| 6,880,086 B2 | 4/2005 | Kidder et al. |
| 6,948,135 B1 | 9/2005 | Ruthfield et al. |
| 6,985,912 B2 | 1/2006 | Mullins et al. |
| 6,999,956 B2 | 2/2006 | Mullins |
| 7,013,435 B2 | 3/2006 | Gallo et al. |
| 7,013,469 B2 | 3/2006 | Smith et al. |
| 7,035,926 B1 | 4/2006 | Cohen et al. |
| 7,039,871 B2 | 5/2006 | Cronk |
| 7,069,330 B1 | 6/2006 | McArdle et al. |
| 7,076,784 B1 | 7/2006 | Russell et al. |
| 7,114,037 B2 | 9/2006 | Agarwal et al. |
| 7,120,914 B1 | 10/2006 | Manthos et al. |
| 7,213,249 B2 | 5/2007 | Loo et al. |
| 7,216,163 B2 | 5/2007 | Sinn |
| 7,231,661 B1 | 6/2007 | Villavicencio |
| 7,249,369 B2 | 7/2007 | Knouse |
| 7,266,595 B1 | 9/2007 | Black et al. |
| 7,340,447 B2 | 3/2008 | Ghatare |
| 7,349,912 B2 | 3/2008 | Delany et al. |
| 7,363,339 B2 | 4/2008 | Delany et al. |
| 7,380,008 B2 | 5/2008 | Teng et al. |
| 7,398,311 B2 | 7/2008 | Joshi et al. |
| 2002/0032684 A1 | 3/2002 | Kobayashi et al. |
| 2002/0038306 A1 | 3/2002 | Griffin et al. |
| 2002/0049749 A1 | 4/2002 | Helgeson et al. |
| 2002/0067370 A1 | 6/2002 | Forney et al. |
| 2002/0073180 A1 | 6/2002 | Dewhurst et al. |
| 2002/0083178 A1 | 6/2002 | Brothers |
| 2002/0138763 A1 | 9/2002 | Delany et al. |
| 2002/0161766 A1 | 10/2002 | Lawson et al. |
| 2003/0028752 A1 | 2/2003 | Fu et al. |
| 2003/0037052 A1 | 2/2003 | Kitain et al. |
| 2003/0046266 A1 | 3/2003 | Mullins et al. |
| 2003/0055762 A1 | 3/2003 | Holt |
| 2003/0055806 A1 | 3/2003 | Wong et al. |
| 2003/0065558 A1 | 4/2003 | Shaw et al. |
| 2003/0083908 A1 | 5/2003 | Steinmann |
| 2003/0088708 A1 | 5/2003 | Lewallen |
| 2003/0097380 A1 | 5/2003 | Mulhern et al. |
| 2003/0105733 A1 | 6/2003 | Boreham et al. |
| 2003/0105742 A1 | 6/2003 | Boreham et al. |
| 2003/0115196 A1 | 6/2003 | Boreham et al. |
| 2003/0115548 A1 | 6/2003 | Melgar |
| 2003/0120593 A1 | 6/2003 | Bansal et al. |
| 2003/0120601 A1 | 6/2003 | Ouye et al. |
| 2003/0144982 A1 | 7/2003 | Reulein et al. |
| 2003/0145074 A1 | 7/2003 | Penick |
| 2003/0204481 A1 | 10/2003 | Lau |
| 2003/0208397 A1 | 11/2003 | VanDusen |
| 2003/0217127 A1 | 11/2003 | Sinn |
| 2003/0217333 A1 | 11/2003 | Smith et al. |
| 2004/0003351 A1 | 1/2004 | Sommerer et al. |
| 2004/0010514 A1* | 1/2004 | Agarwal et al. .......... 707/104.1 |

| 2004/0024762 A1 | 2/2004 | Agarwal et al. |
| 2005/0240490 A1 | 10/2005 | Mackey |

OTHER PUBLICATIONS

Kim, K.H., "APIs for Real-Time Distributed Object Programming", Computer, IEEE 2000, June, pp. 72-80.
Leon, Mark, "McAfee's NetTools Promises To Ease Network Desktop Diagnosis," InfoWorld, vol. 17, Issue 30, p. 53, Jul. 24, 1995.
McLellan, et al., "Building More Usable APIs", IEEE Software, pp. 78-86, May/Jun. 1998.
Musthaler, Linda, "The Trouble With Help Desk Selection," Network World, vol. 12, Issue 8, pp. 35-39, Feb. 20, 1995.
Netegrity Inc., "SiteMinder Agent Operations Guide," Version 4.0, pp. 1-174, 1997.
Netegrity Inc., "SiteMinder Deployment Guide," Version 4.0, pp. 1-314, 1997.
Netegrity Inc., "SiteMinder Developer's API Guide," Version 4.0, pp. 1-368, 1997.
Netegrity Inc., "SiteMinder Installation Guide," Version 4.0, pp. 1-280, 1997.
Netegrity Inc., "SiteMinder Policy Server Operations Guide," Version 4.0, pp. 1-556, 1997.
Saba—Products, Saba Enterprise 5, dated 1997-2006, 2 pages.
Saba—Company, dated 1997-2006, 1 page.
Saba—Solutions, Competency-Driven HCM, dated 1997-2006, 1 page.
Saba—Talent, dated 1997-2006, 2 pages.
Saba—Collaboration, dated 1997-2006, 1 page.
Schmersal, Frank, "Testing To Maintain Service Standards," Communications News, vol. 35, Issue 3, pp. 22-23, Mar. 1998.
Securant Technologies, Inc., "Clear Trust, Unified Access Management," pp. 1-23, 1997.
Stets, et al., "Component-Based APIs for Versioning and Distributed Applications", IEEE, pp. 54-61, 1999.
U.S. Appl. No. 09/570,276, Office Action dated Nov. 14, 2006, 28 pages.
U.S. Appl. No. 10/314,888, Office Action dated Jan. 26, 2006, 31 pages.
U.S. Appl. No. 10/314,888, Office Action dated Jul. 26, 2006, 26 pages.
U.S. Appl. No. 10/314,888, Office Action dated Feb. 9, 2007, 34 pages.
U.S. Appl. No. 10/325,456, Office Action dated Sep. 19, 2006, 25 pages.
U.S. Appl. No. 10/327,607, Office Action dated Feb. 13, 2006, 5 pages.
U.S. Appl. No. 10/327,607, Office Action dated Apr. 18, 2006, 33 pages.
U.S. Appl. No. 10/328,920, Office Action dated May 31, 2006, 20 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/345,879, Office Action dated Oct. 5, 2006, 30 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,913, Office Action dated May 12, 2006, 16 pages.
U.S. Appl. No. 10/354,914, Office Action dated Aug. 1, 2005, 15 pages.
U.S. Appl. No. 10/354,914, Final Office Action dated Feb. 10, 2006, 16 pages.
U.S. Appl. No. 10/314,888, Office Action dated Jul. 27, 2007, 37 pages.
U.S. Appl. No. 10/314,888, Final Office Action dated Feb. 22, 2008, 37 pages.
U.S. Appl. No. 10/325,465, Final Office Action dated Apr. 4, 2007, 25 pages.
U.S. Appl. No. 10/325,465, Advisory Action dated Jun. 19, 2007, 3 pages.
U.S. Appl. No. 10/325,465, Office Action dated Dec. 12, 2007, 20 pages.
U.S. Appl. No. 10/327,607, Final Office Action dated Oct. 10, 2006, 33 pages.
U.S. Appl. No. 10/327,607, Office Action dated Apr. 30, 2007, 31 pages.
U.S. Appl. No. 10/327,607, Final Office Action dated Nov. 16, 2007, 35 pages.
U.S. Appl. No. 10/327,607, Advisory Action dated Feb. 4, 2008, 3 pages.
U.S. Appl. No. 10/328,920, Notice of Allowance dated Dec. 5, 2006, 8 pages.
U.S. Appl. No. 10/345,873, Notice of Allowance dated Jul. 6, 2006, 6 pages.
U.S. Appl. No. 10/345,879, Final Office Action dated May 17, 2007, 39 pages.
U.S. Appl. No. 10/345,879, Advisory Action dated Jul. 27, 2007, 5 pages.
U.S. Appl. No. 10/345,879, Office Action dated Oct. 31, 2007, 35 pages.
U.S. Appl. No. 10/354,913, Final Office Action dated Oct. 31, 2006, 15 pages.
U.S. Appl. No. 10/354,913, Final Office Action dated Apr. 18, 2007, 20 pages.
U.S. Appl. No. 10/354,913, Ex Parte Quayle Action dated Nov. 1, 2007, 7 pages.
U.S. Appl. No. 10/354,913, Office Action dated Feb. 7, 2008, 10 pages.
U.S. Appl. No. 10/354,914, Office Action dated Sep. 22, 2006, 8 pages.
U.S. Appl. No. 10/354,914, Final Office Action dated Apr. 5, 2007, 9 pages.
U.S. Appl. No. 10/354,914, Notice of Allowance dated Mar. 12, 2008, 11 pages.
Jung-Jang Jeng, "An Approach to Designing Reusable Service Frameworks via Virtual Service Machine," ACM, May 18-20, 2001, pp. 58-66.
Nenad Medvidovic et al., "Modeling Software Architectures in the Unified Modeling Language," ACM, Jan. 2002, pp. 2-57.
U.S. Appl. No. 10/314,888, Advisory Action dated May 30, 2008, 3 pages.
U.S. Appl. No. 10/327,607, Notice of Allowance dated Aug. 6, 2008, 36 pages.
U.S. Appl. No. 10/345,879, Notice of Allowance dated May 19, 2008, 6 pages.
U.S. Appl. No. 10/354,913, Notice of Allowance dated Jun. 12, 2008, 8 pages.
U.S. Appl. No. 10/952,592, Final Office Action dated May 3, 2007, 54 pages.

* cited by examiner

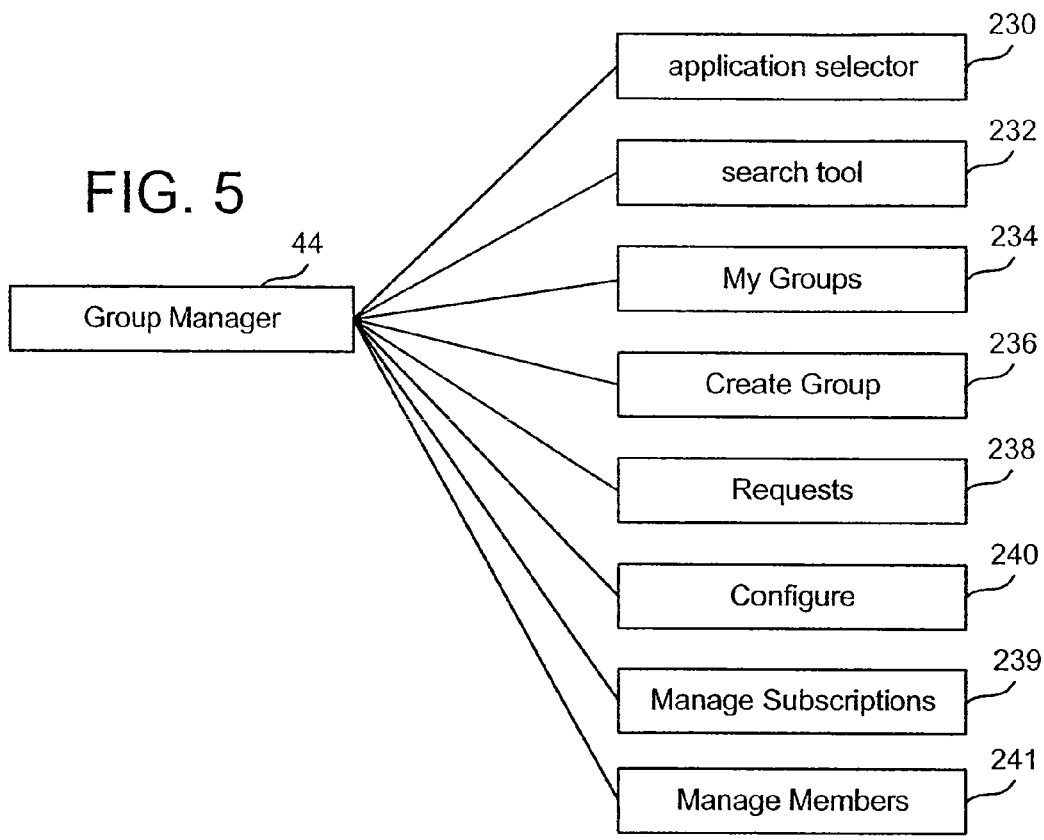
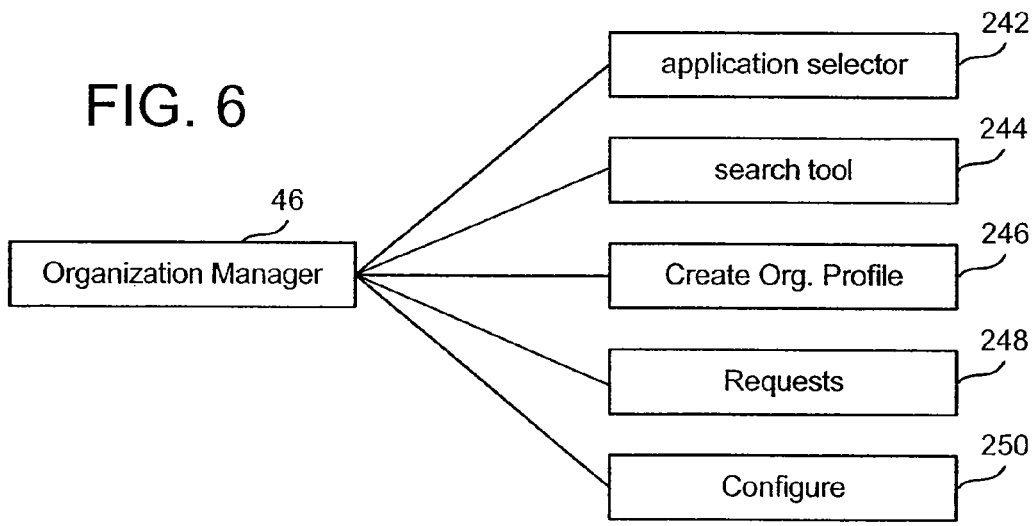

IDENTIFYING DYNAMIC GROUPS

This application is a continuation of U.S. patent application Ser. No. 10/328,920 filed Dec. 23, 2002 by Delaney et al. and entitled "Identifying Dynamic Groups," which claims the benefit of U.S. Provisional Application No. 60/395,152, "Access and Identity System," filed on Jul. 11, 2002. Both of these applications are incorporated herein by reference.

CROSS-REFERENCE TO RELATED APPLICATIONS

This application is related to U.S. patent application Ser. No. 09/998,926, entitled "Determining Group Membership," filed on Nov. 30, 2001, and incorporated herein by reference in its entirety.

BACKGROUND OF THE INVENTION

1. Field of the Invention

The present invention is directed to technology for identifying dynamic groups that correspond to an entity, such as a user.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

In many instances it is useful to identify the groups corresponding to a user. For example, an employee at a company may want to know all the groups that include the employee as a member. Ideally, an Identity System would be able to create a list of such groups for the employee. Providing such a list can be very computation intensive when all or some of the groups are dynamic groups—groups that identify membership with a filter instead of a static membership list. One implementation of a filter or rule specifies attribute values an employee profile must contain in order for the employee to qualify as a group member.

The Identity System may need to determine a user's dynamic groups by comparing the user's profile to each dynamic group's filter, even though users typically belong to much less than all of the groups. This comparison can consume substantial processing time and memory bandwidth. In a directory based Identity System, each dynamic group comparison requires a separate directory access of the user's profile. It would be desirable for a user's corresponding dynamic groups to be identified more efficiently in some circumstances.

In order to avoid the identification of dynamic groups, some systems maintain dynamic filters for group membership in user profiles. The group filter in a user profile dynamically defines one or more groups that include the user. In this scheme, all of a user's groups can be identified by a single directory access of the user profile. This solution, however, does not allow system administrators to organize users through the implementation of group profiles. This can be a significant drawback. The use of dynamic group profiles is a popular scheme for grouping large numbers of entities, such as users. Without the use of dynamic groups, the creation of a new group may require the updating of each group member's profile.

Some Identity System users also employ an Access Systems. An Access System provides for the authentication and authorization of users attempting to access resources. For efficiency purposes, there is an advantage to integrating the Identity System and the Access System. For example, both systems may utilize a single set of group objects that identify user membership in various groups. Additionally, integrating the Identity System and the Access System allows for single-sign-on functionality across multiple resources. Thus, there is also a need to efficiently support the identification of a user's dynamic groups for Access Systems and integrated Identity/Access Systems. Systems other than Identity and Access Systems can also benefit from the efficient identification of a user's groups.

SUMMARY OF THE INVENTION

The present invention, roughly described, pertains to technology for identifying dynamic groups that correspond to a user. In many instances, users and other entities only belong to a small percentage of the dynamic groups being maintained in a system. Embodiments of the present invention reduce the number of data accesses and dynamic group filter comparisons under these circumstances.

In one embodiment, an Identity System partitions a set of dynamic groups into multiple test sets. Each test set contains a subset of the dynamic groups. The system selects a test set and determines whether a user corresponds to the test set. In one example, the system determines whether the attributes in the user's profile meets the criteria established by any of the filters for the dynamic groups in the test set.

One implementation of the Identity System combines the filters for each dynamic group in each test set into a single filter that represents each dynamic group filter's criteria. For example, the test set filter is a logical OR of the test set's dynamic group filters in one embodiment. This enables the system to perform a single comparison between the resulting test set filter and the user profile—determining whether the user is a member of any dynamic group in the test set. If the user is not a member of any dynamic group in the test set, the system eliminates all of the test set's dynamic groups from consideration, based on the single comparison. Otherwise, the dynamic groups in the test set remain in a list of groups that may include the user. This process is repeated for each test set.

In one embodiment, user profiles and dynamic group profiles are maintained in a Lightweight Directory Access Protocol ("LDAP") directory. The system implements the above-described comparison as a base object search of the entity's profile using the test set filter. This allows a single directory access to yield the simultaneous elimination of multiple dynamic groups that do not include the user, as opposed to requiring separate directory accesses for each dynamic group. In alternate embodiments, protocols other than LDAP can be employed.

After each test set has been evaluated, the remaining list of dynamic groups is partitioned again into a new set of test sets. Each new test set contains a subset of the remaining dynamic groups. In one embodiment, the new test sets contain half as many dynamic groups as the previous set of test sets contained. Each of the new test sets is evaluated as described above. After the evaluation, new test sets are repeatedly generated and evaluated in the above-described fashion, until each test set only contains one dynamic group. After performing an iteration with each test set containing one dynamic group, the only remaining dynamic groups are the ones that include the entity as a member.

In an alternate implementation, the system drills down into each test set after the initial partitioning. For each test set, the system removes each dynamic group that does not include the user. In drilling down, the system repeatedly partitions the test set and forms a filter for each partition that represents all of the dynamic group filters in the partition. The system uses these filters to determine whether the user's profile satisfies any of the dynamic group filters in the partition, similar to the process above.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a block diagram depicting the Group Manager.

FIG. 6 is a block diagram depicting the Organization Manager.

DETAILED DESCRIPTION

Figure 1:
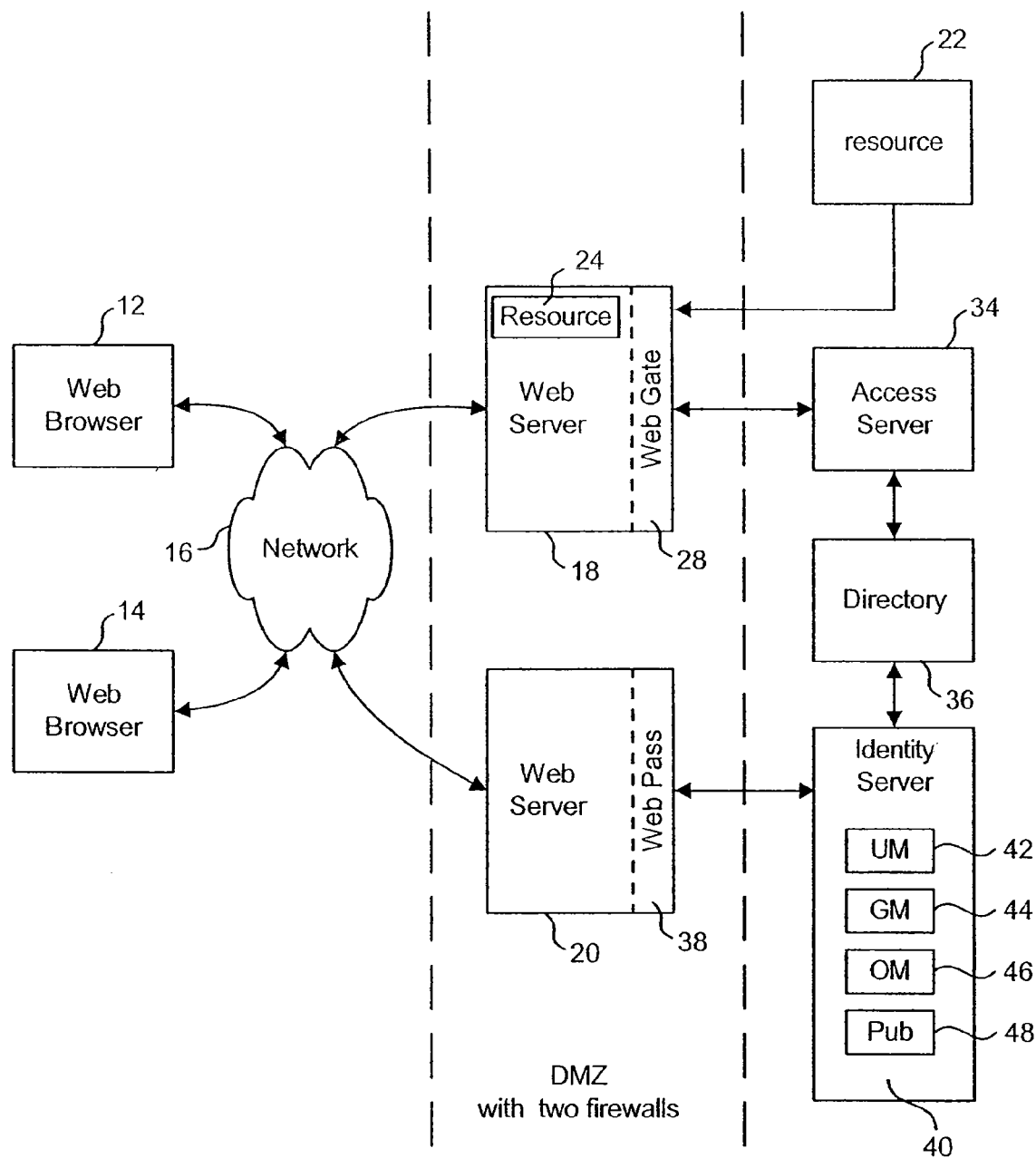
FIG. 1 is a block diagram depicting the components of one embodiment of the present invention.

FIG. 1 depicts an example of an access management system that provides identity management services and/or access management services for a network. The identity management portion of the system (hereinafter "the Identity System") manages identity profiles, while the access management portion of the system (hereinafter "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
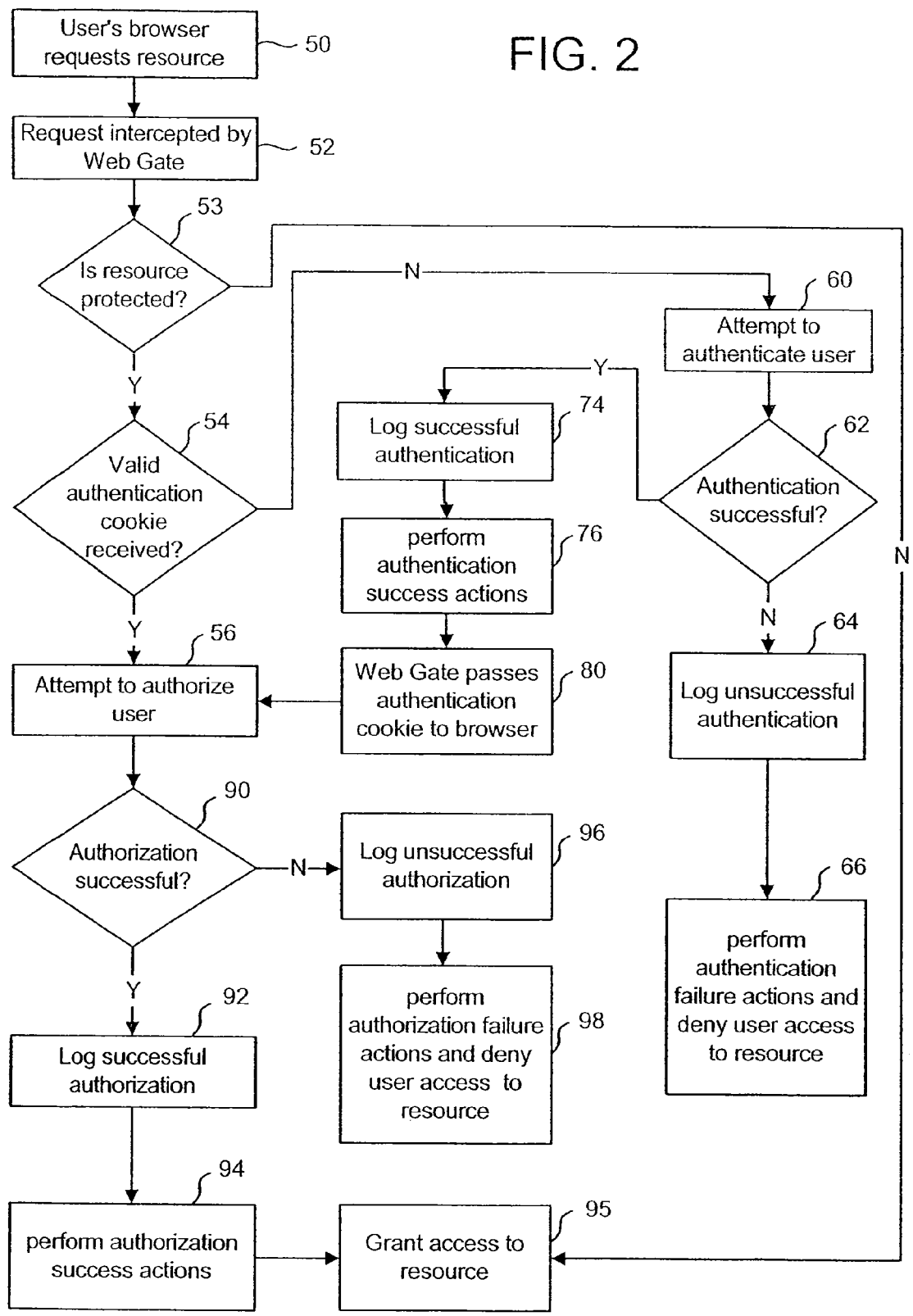
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/998,926, "Determining Group Membership," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
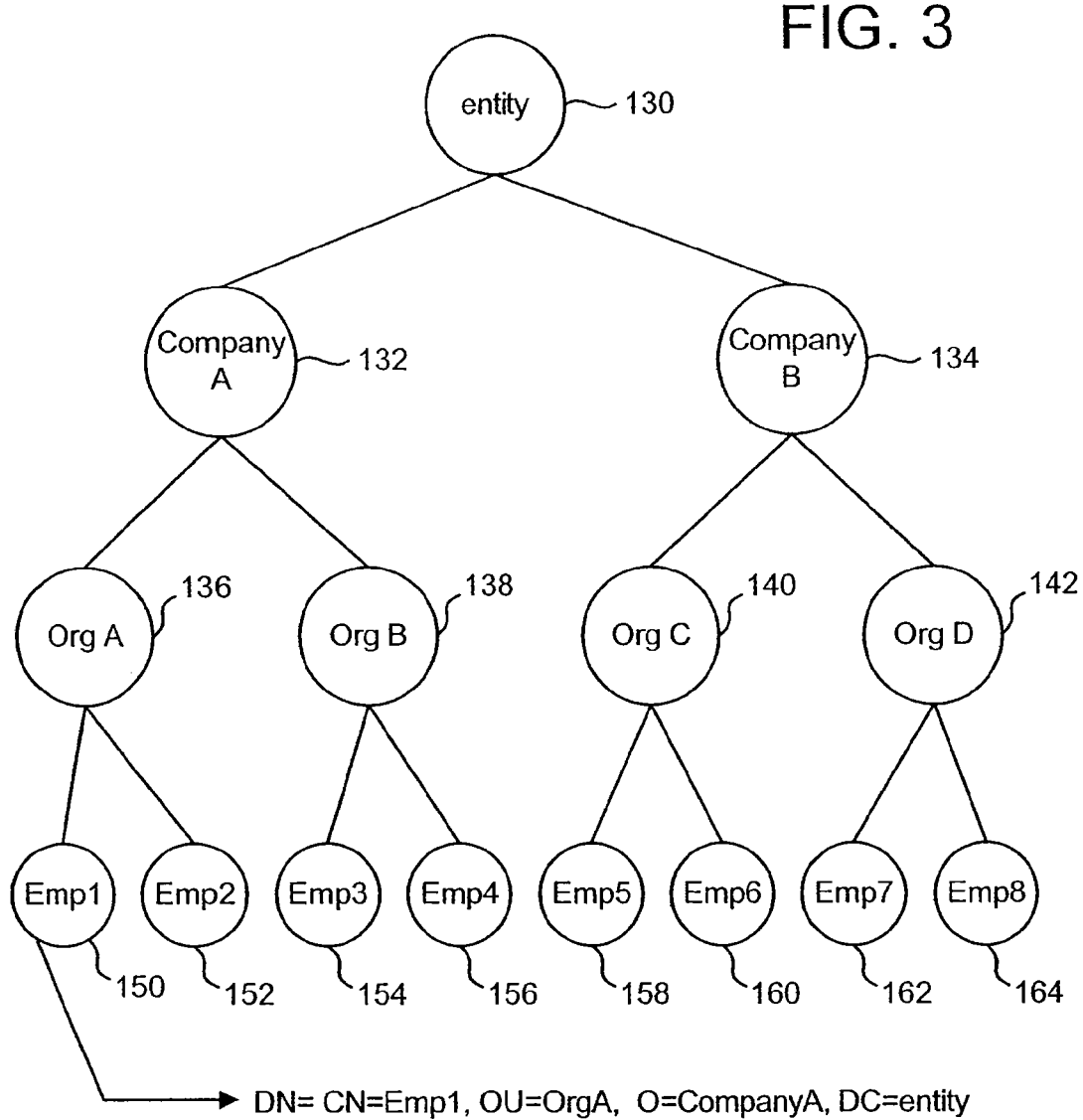
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:
  DC=Domain Component
  O=Organization
  OU=Organizational Unit
  CN=common name.

FIG. 3 shows a hierarchical tree. Some organizations employ fat or flat trees for ease of maintenance. A flat directory tree may be a directory information tree that does not have any hierarchy or a shallow tree structure with a higher ratio of leaves to total nodes. A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory structure mirrored in the physical directory structure, such as using the physical directory structure to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
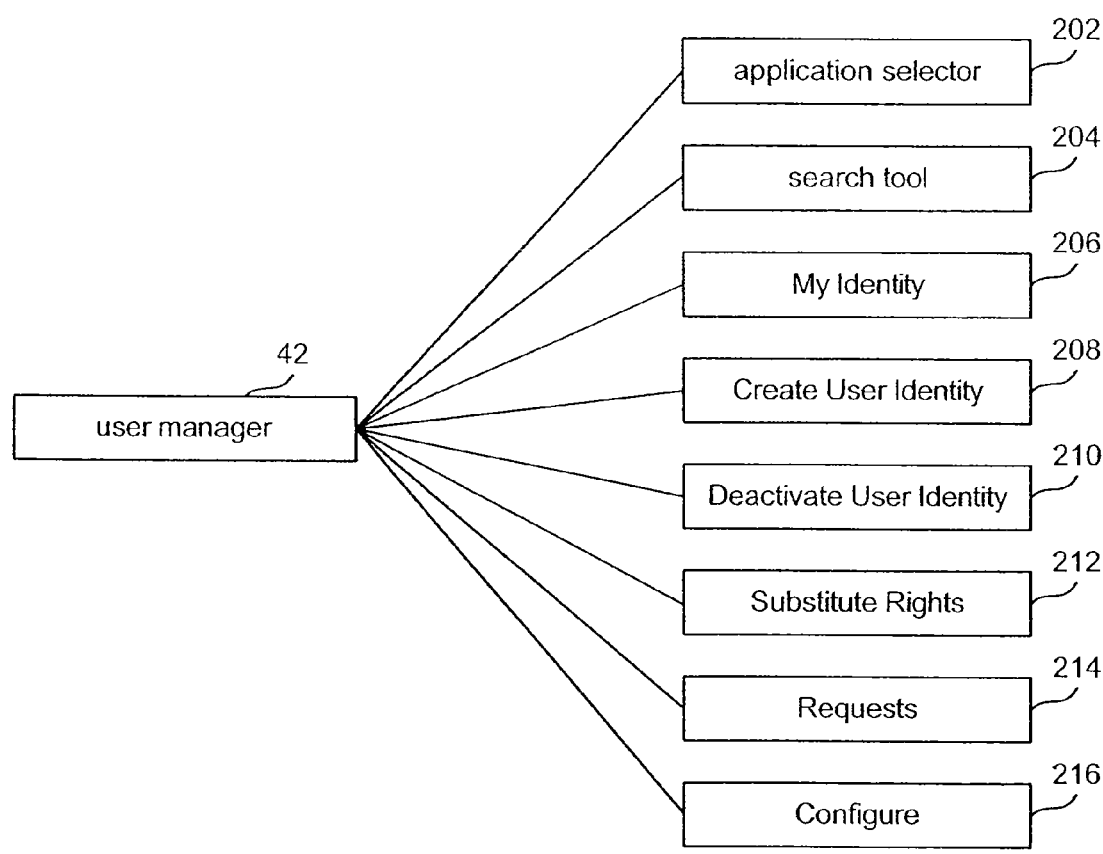
FIG. 4 is an block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Looking back at FIG. 5, one of the services provided by Group Manager 44 is to the ability to view a list of all groups of which a user is a member. A user can be a static member of a group, a dynamic member of a group or a nested member of a group. A user is a static member if the user is explicitly listed as a member. For example, the user can be identified in a membership attribute of the group identity profile. A user is a dynamic member if the user's identity profile satisfies the LDAP rule that specifies the group's dynamic membership. The LDAP rule is stored in an attribute of the group identity profile. A user is a nested member of Group A if the user is a member of Group B and Group B is a member of Group A. The number of levels of nesting is not limited. A nested member of a group receives the privileges of being a member, including receiving access to resources available to the group.

When a user selects the My Groups tab 234, the user is provided with a list of the groups for which the user is a static member, dynamic member or nested member. In one embodiment, My Groups tab 234 visualizes the containment relationship of all groups in which the user is a member. This relationship is displayed as a tree on its side, with the roots on the left and the leaves on the right. The display allows the user to tunnel down from a particular group to display the groups contained in (e.g. that are a member of) that group, and so on.

Figure 7:
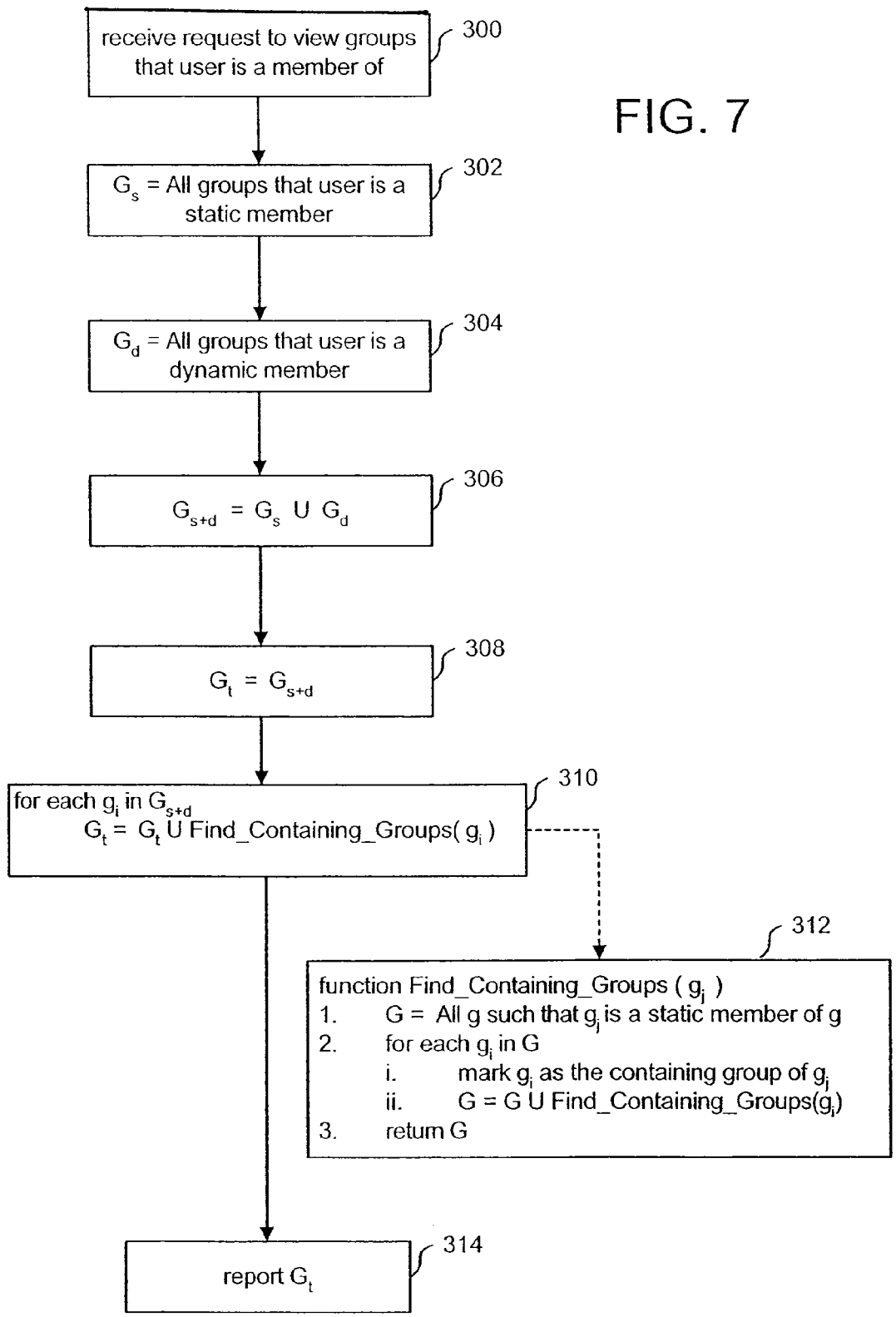
FIG. 7 is a flow chart describing one embodiment of a process for viewing all groups corresponding to an entity.

FIG. 7 is a flowchart describing one embodiment of a process for determining all the groups of which a user is a member, including static membership, dynamic membership and nested membership. The process can be used to build a tree structure in which the nodes are groups that contain the user as a member. The leaf nodes of the tree are those groups in which the user is a static or dynamic member. All other nodes are groups in which the user is a nested member. The process of FIG. 7 assumes the following:

Let u denote the target user;
Let g denote a single group;
Let G denote a set of groups, where the $g_i$ denotes the $i^{th}$ group in the set;
Let $G_s$ denote the set of groups in which u is a static member;
Let $G_d$ denote the set of groups in which u is a dynamic member; and
Let $G_t$ denote the set of groups in which each $g_i$ has a reference to each of its containing groups.

The process of FIG. 7 starts at step 300 when a user requests to view groups of which the user is a member. One example of performing step 310 is the selection of My Groups tab 234 (see FIG. 5). The system determines all groups of which the user is a static member (step 302). Each group identity profile has an attribute defining static membership. The system determines all groups for which the user is specifically listed in the static membership attribute. The system determines all groups of which the user is a dynamic member (step 304). A group can have an attribute that defines a dynamic membership in terms of an LDAP filter/rule. In one embodiment, the system compares the user's identity profile with the LDAP filter for each group to determine which filters are satisfied by the user's identity profile. Those LDAP filters that are satisfied are groups in which the user is a dynamic member. Further details regarding the identification of dynamic groups for a user are presented below.

The set of groups that the user is a static member of and the set of groups that the user is a dynamic member of are combined to determine the set of groups in which the user is either a dynamic or static member (step 306). The final set of groups $G_t$ is initialized to the set of groups in which the user is either a static member or dynamic member (step 308). For each group in which the user is a static or dynamic member, the system calls the function Find_Containing_Groups (step 310). The results of the function are added to the set $G_t$. The resulting set $G_t$ is reported as an identification of all the groups in which the user is either a static, dynamic or nested member (step 314). The resulting set can be reported in various ways including reporting the groups in a GUI for the user (e.g. a tree on its side), reporting the groups to the user in a non-graphical format, storing a list of the groups in a file, providing identifications of the groups to another process, etc. In one example, the Access System requests that the Identity System determine a user's groups so that the Access System can authorize a user to access a resource based on membership in a particular group.

The function Find_Containing_Groups (shown as step 312) includes three sub-steps. In the first sub-step (substep 1 in step 312), the system finds all groups that contain $g_j$ as a member. These are the containing groups of $g_j$. In the second sub-step, the system iterates over the set of containing groups. In sub-step 2.i. (step 312), the system marks $g_i$ as a containing group $g_j$. The markings are provided in order to graphically show the nesting relationship in My Groups tab 234. In sub-step 2.ii. (step 312), the system recursively finds the containing groups of $g_i$. In sub-step 3 (step 312), the system returns the closure of the set of containing groups.

Figure 8:
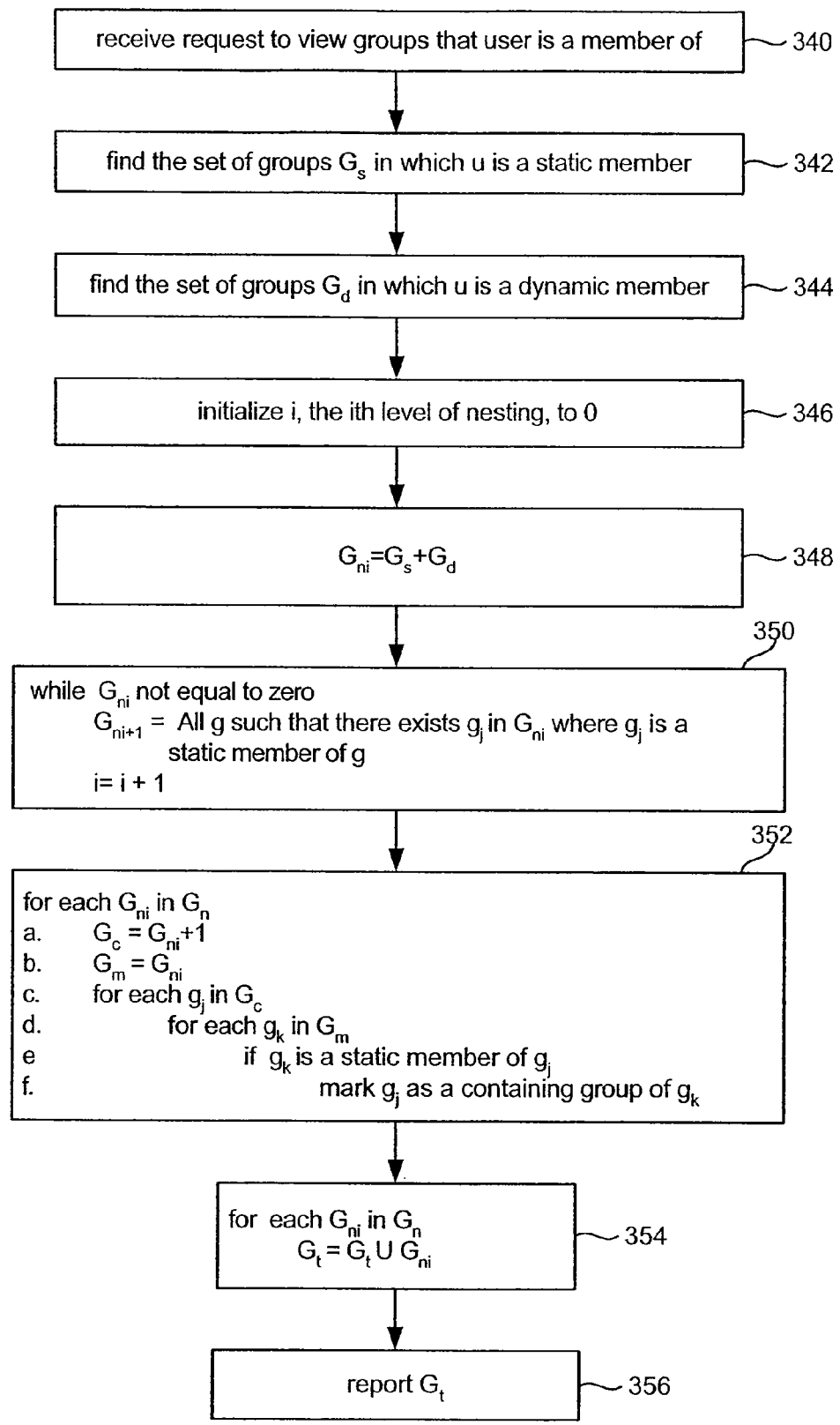
FIG. 8 is a flow chart describing a second embodiment of a process for viewing all groups corresponding to an entity.

FIG. 8 is a second embodiment of a process for determining the groups in which the user is a member. The process of FIG. 8 is a more optimized method than FIG. 7. The process of FIG. 8 utilizes the following assumptions:

Let u denote the target user;
Let g denote a single group;
Let G denote a set of groups where $g_i$ denotes the $i^{th}$ group in the set;
Let $G_s$ denote the set of groups in which u is a static member;
Let $G_d$ denote the set of groups in which u is a dynamic member;
Let $G_{ni}$ denote the set of groups in which u is a nested member, where i denotes the $i^{th}$ level of nesting;
Let $G_n$ denote the set of $G_{ni}$ where i is the $i^{th}$ set of groups;
Let $G_c$ be a set of groups, where $g_j$ denotes the $j^{th}$ group in the set; and
Let $G_m$ be a set of groups, where $g_k$ denotes the $k^{th}$ group in the set, such that for all $g_k$, there exists $g_j$ such that $g_k$ is a static member of $g_j$.

In step 340 of FIG. 8, the system receives a request to view groups of which a user is a member. One example of performing step 340 is the user selecting My Groups tab 234. The system determines the set of groups $G_s$ in which the user is a static member (step 342). The system determines the set of groups $G_d$ in which the user is a dynamic member (step 344). The variable i is initialized to nesting level 0 (step 346). $G_{ni}$ is initialized to be the union of $G_s$ and $G_d$ (step 348). The system iterates until the set of groups for the $i^{th}$ level of nesting is empty, finding the $(i+1^{th})$ set of groups which contain groups that have a static member that is in the $i^{th}$ set of groups (step 350).

The system iterates over the set of groups in $G_n$ (step 352). In step a, $G_c$ is set to $G_{ni+1}$. In step b, $G_m$ is assigned to equal $G_{ni}$. In step c, the system iterates over the containing set of groups $G_c$. In step d, the system iterates over the contained set of groups $G_m$. In step e, the system determines if group $g_k$ (the contained group under consideration) is a static member of the group $g_j$ (the containing group under consideration). In step f, the containing group $g_j$ is marked as a containing group of $g_k$, if $g_k$ is a static member of $g_j$. The system iterates over the set of $G_{ni}$, adding each set of groups to the final set $G_t$ (step 354). The resulting set of groups $G_t$ is reported back to the requester (step 356).

Figure 9:
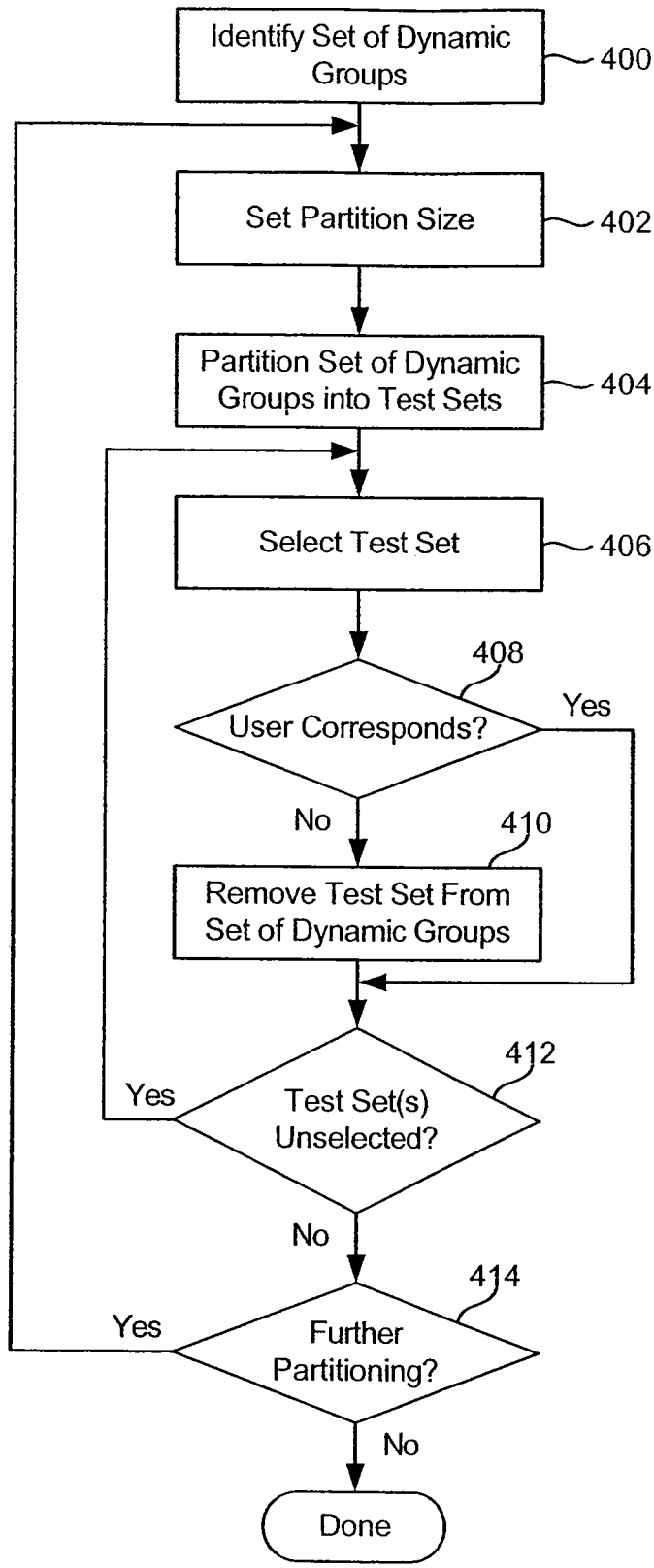
FIG. 9 is a flow chart describing one embodiment of a process for identifying dynamic groups corresponding to an entity.

FIG. 9 is a flowchart describing one embodiment of a process for identifying all of the dynamic groups that include a user (step 304, FIG. 7 and step 344, FIG. 8). This process is described with reference to the Identity System, but in alternate embodiments, the process can be carried out by the Access System, an integrated Access System and Identity System, or another type of system. In one embodiment, the user is represented in the Identity System by a user profile, which may also be referred to as a user object. In further embodiments, dynamic groups are identified for an entity other than a user. Embodiments of the invention can also be implemented for dynamic profiles other than group profiles.

For example, dynamic organization profiles can be employed. In another example, a role is defined by a dynamic profile, and the present invention is used to determine the roles that correspond to an entity, such as a user. An example role is a job type, such as manager.

The Identity System identifies a set of dynamic groups that have the potential for including the user as a member (step 400). In one implementation, the set may include all dynamic groups accessible by the Identity System. In alternate implementations, the identified set of dynamic groups is a subset of all the dynamic groups accessible by the Identity System. Greater details regarding the selection of a subset are provided below. The Identity System sets a partition size (step 402). The partition size is less than the number of dynamic groups in the set of dynamic groups identified in step 400. In one example, the partition size is set to 20.

The Identity System partitions the set of dynamic groups into test sets (step 404). In one embodiment, the Identity System assigns each dynamic group to a test set, so that each test set contains the number of dynamic groups specified by the partition size. For example, when the partition size is 20, the Identity System partitions a set of 100 dynamic groups into 5 test sets with each test set containing 20 dynamic groups. If the set of dynamic groups cannot be evenly divided into test sets of the partition size, the Identity System can use various methods for resolving the dilemma. In one example, the Identity System provides for all but one of the test sets to contain the number of dynamic groups specified by the partition size. The remaining one test set contains less than the partition size. For example, when the partition size is 20, the Identity System partitions a set of 98 dynamic groups into 4 test sets of 20 dynamic groups and 1 test set of 18 dynamic groups. In further embodiments, multiple test sets can have less than the partition size of dynamic groups. Alternatively, one or more test sets may have more dynamic groups than specified by the partition size. In another embodiment, partitioning is not based on size. An alternate mechanism is employed, such as filter similarity.

The Identity System selects one of the test sets (step 406) and determines whether the user corresponds to the test set (step 408). In one implementation, the Identity System determines correspondence (step 408) by determining whether the user satisfies the requirements of any of the filters for the test set's dynamic groups. For example, the Identity System determines whether the attributes in the user's profile meet the requirements of any of the filters for the test set's dynamic groups. In order to make this determination, the Identity System employs a test set filter in one embodiment. The test set filter is satisfied if any of the filters from the test set's dynamic group are satisfied. In one example, the test set filter is a logical OR of the filters for the dynamic groups in the test set.

Using a single test set filter is beneficial when the user and dynamic group profiles are maintained in a directory server. The Identity System evaluates the user's attributes through a single comparison access of the user's profile using the test set filter—eliminating the need to access the user profile for each dynamic group in the test set. Greater details about determining whether the user corresponds to a test set (step 408) are provided below.

If the user does not correspond to the test set (step 408), the Identity System removes the dynamic groups in the test set from the set of dynamic groups identified in step 400 (step 410). Otherwise, the Identity System does not alter the list of dynamic groups in the identified set. The Identity System goes on to determine whether any of the test sets have not yet been selected (step 412). If an unselected test remains, another test set is selected (step 406) and the above-described process is repeated. Otherwise, the Identity System determines whether to perform further partitioning (step 414). If not, the process is complete. Otherwise, the Identity System sets a new partition size (step 402) and repeats the above-described process.

In one implementation, the Identity System proceeds with further partitioning, unless the last partition size employed was 1. In this implementation, further partitioning causes the remaining dynamic groups in the initial set to be partitioned again (step 404) using a newly selected partition size. The new partition size is less than the previous partition size in one embodiment. In one example, the partition size is half of the prior partition size. When the partition size reaches a value of 1, the Identity System partitions each of the remaining dynamic groups into its own test set. As a result, the correspondence evaluation is step 408 and subsequent removal of non-corresponding dynamic groups in step 410 leave a final list of dynamic groups. The final list of dynamic groups are all of the dynamic groups from the initial set that include the user as a member.

Figures 10, 11:
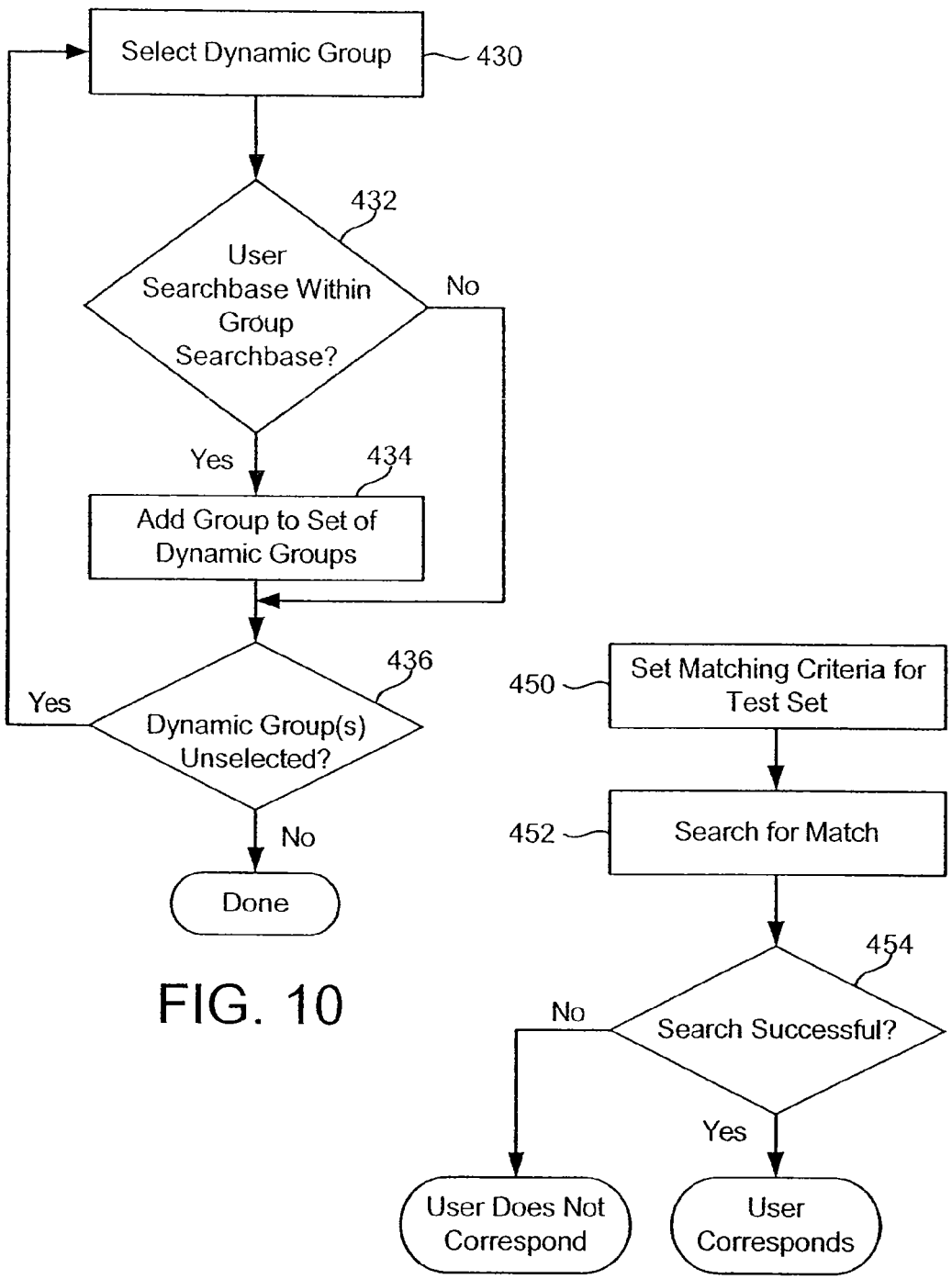
FIG. 10 is a flow chart describing one embodiment of a process for identifying a set of dynamic groups.
FIG. 11 is a flow chart describing one embodiment of a process for determining whether an entity corresponds to a test set including at least one dynamic group.

FIG. 10 is a flow chart describing one embodiment of a process for identifying a set of dynamic groups (step 400, FIG. 9). The Identity System selects a dynamic group that is accessible by the Identity System (step 430). The Identity System determines whether the user's searchbase is within the searchbase of the rule of the dynamic group (step 432). In one such embodiment, the user and dynamic group profiles are maintained in an LDAP directory server. In step 432, the Identity System determines whether the distinguished name of the user has the potential for falling within the directory tree path specified by the LDAP rule governing the dynamic group's membership. In LDAP implementations, the user's distinguished name is frequently maintained in a local memory, making it accessible without the need for a directory server access. This can enable the elimination of many non-corresponding dynamic groups without the need for multiple directory server accesses.

For example, the entity may be employee 1 (node 150) shown in FIG. 3. The Identity System determines whether the dynamic group's LDAP rule has the potential for accepting a user in Org A (node 136, FIG. 3) of Company A (node 132, FIG. 3). If so, the user searchbase falls within the searchbase of the rule of the dynamic group. If not, the user searchbase is considered not to fall within the searchbase of the rule of the dynamic group. As an example, if the dynamic group's filter only calls for users in Company B (node 134, FIG. 3), the user searchbase is considered not to fall within the searchbase of the rule of the dynamic group.

If the user searchbase is within the searchbase of the rule of the dynamic group, Identity System includes the dynamic group in the set of dynamic groups identified in step 400 of FIG. 9 (step 434). Otherwise, the dynamic group is not added to the set. The Identity System goes on to determine whether any accessible dynamic groups have not yet been selected (step 436). If all accessible dynamic groups have been selected, the process is complete. Otherwise, a new dynamic group is selected and the process in FIG. 10 is repeated.

In an alternate embodiment, an LDAP directory is not employed. Various other data management solutions can be implemented. For example, the LDAP directory server can be replaced by a relational database.

FIG. 11 is a flow chart describing one embodiment of a process for determining whether a user corresponds to a test set including at least one dynamic group (step 408, FIG. 9). The process shown in FIG. 11 can be employed in embodiments where the user and group profiles are maintained in a directory server. The Identity System sets the matching criteria for the test set (step 450). In one implementation, the matching criteria is an LDAP rule with 3 components set by the Identity System.

The 3 components include a filter, searchbase, and scope. The Identity System sets the filter component, so that the filter is satisfied if the filter of any dynamic group in the test set is satisfied. In one implementation, the test set's filter is a logical OR of the filters from the test set's dynamic groups. The Identity System sets the searchbase component to the distinguished name of the user and the scope to base object. A base object scope is a standard LDAP scope that restricts searching to the identified searchbase. In alternate embodiments, the scope can be set differently, such as single level or whole subtree. In further embodiments, LDAP is not employed. For example, a relational database can be implemented with matching criteria defined by an SQL query.

After setting the matching criteria, the Identity System performs a search of the directory server based on the matching criteria from step 450 (step 452). In the LDAP environment, the Identity System employs the 3 component rule to perform the search. If the search is successful, the user profile is recognized as a match—indicating that the user corresponds to the test set (step 454). Otherwise, an unsuccessful search yields a failed result—indicating that the user does not correspond to the test set (step 454).

In an alternate embodiment, a test filter is employed to determine whether a user corresponds to a test set including at least one dynamic group (step 408, FIG. 9). This avoids the need to access Directory Server 36 when making the determination. The test filter maintains a local copy of the user profile and compares the local copy to the matching criteria.

Figure 12:
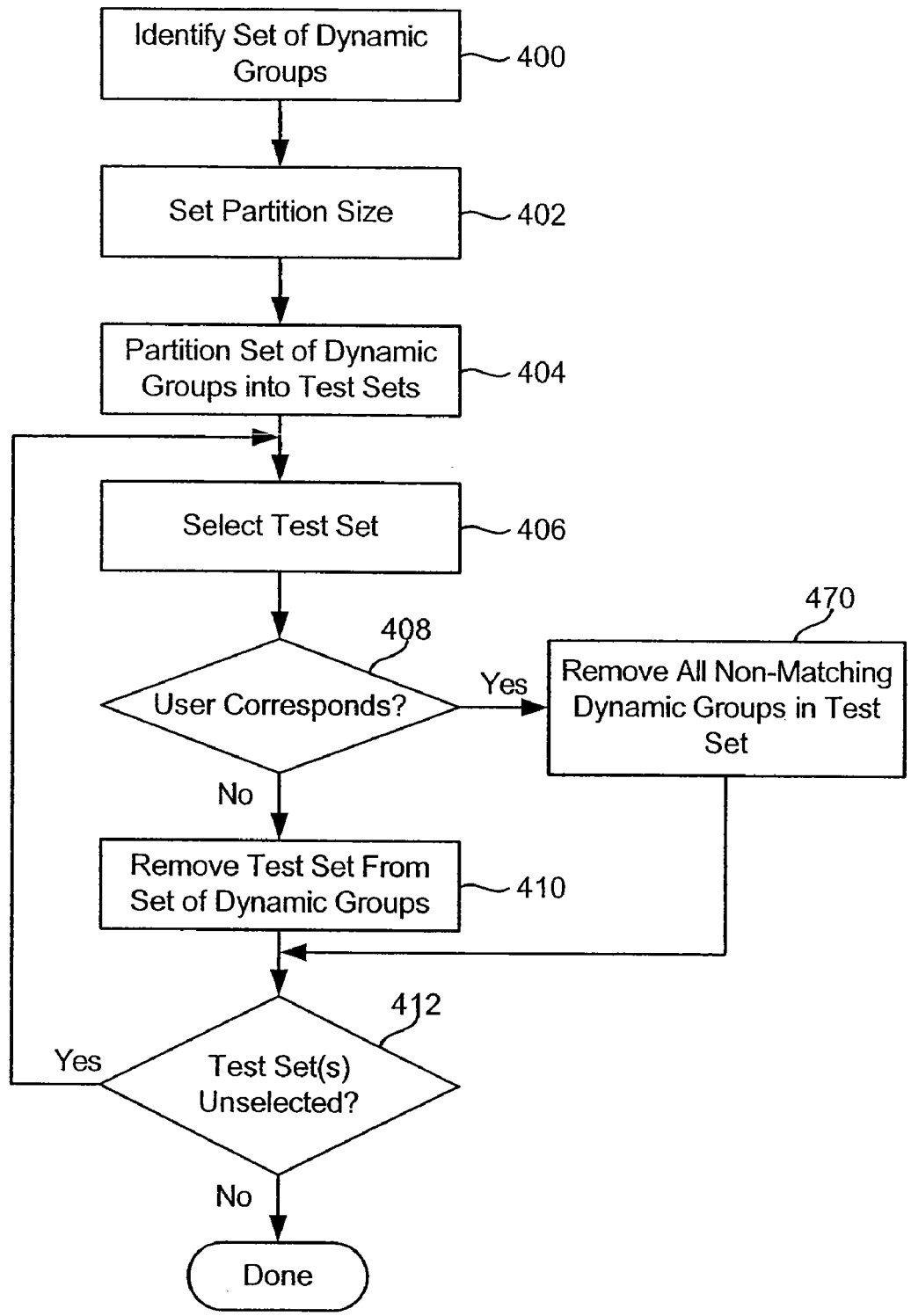
FIG. 12 is a flow chart describing an alternate embodiment of a process for identifying dynamic groups corresponding to an entity.

FIG. 12 is a flowchart describing an alternate embodiment of a process for identifying dynamic groups corresponding to a user. Each step in FIG. 12 with the same reference number as a step in FIG. 9 operates in the same manner as described above for the step in FIG. 9. In FIG. 12, the Identity System drills down into each initial test set to remove all dynamic groups from the initial test set that do not correspond to the user (step 470). The Identity System performs this operation if the user is found to correspond to the initial test set in step 408. In drilling down, the Identity System repeatedly partitions the initial test set and evaluates the partitions for matches to the user—employing the same operation described above for partitioning and evaluating correspondence of the initially identified set of dynamic groups. The process shown in FIG. 12 allows multiple threads of operation to conceivably drill down into multiple initial test sets—potentially increasing the speed of identifying dynamic groups that correspond to a user.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of identifying dynamic groups corresponding to a user, the method comprising:
    based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said user to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;

selecting, by the computer system, a test set from the multiple test sets;

storing an identification of each of said dynamic members of said at least one dynamic group, wherein said identification of each of said dynamic members is stored in said static member attribute for said identity profile of said at least one dynamic group;

determining, by the computer system, whether said identity profile corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and removing, by the computer system, the selected test set from the multiple test sets in response to the said static member attributes within said identity profile not meeting the selected test set's filter requirements.

2. A method according to claim 1, wherein determining whether said user corresponds to a test set in said multiple test sets comprises:
setting matching criteria for said test set; and
determining whether said user satisfies said matching criteria.

3. A method according to claim 2, wherein each dynamic group in said test set corresponds to at least a portion of said matching criteria.

4. A method according to claim 2, wherein said matching criteria includes a logical OR of at least one filter from each dynamic group in said test set.

5. A method according to claim 2, wherein said matching criteria is satisfied if a filter for any dynamic group in said test set is satisfied.

6. A method according to claim 2, wherein:
said matching criteria is a rule including a filter component, and
said filter component is satisfied if any filter from a dynamic group in said test set is satisfied.

7. A method according to claim 6, wherein said filter component is a logical OR of a filter from each dynamic group in said test set.

8. A method according to claim 6, wherein:
said filter component is a logical OR of a filter defining each dynamic group in said test set.

9. A method according to claim 6, wherein:
said rule includes a searchbase component, and
said searchbase component corresponds to a subtree containing said user.

10. A method according to claim 6, wherein:
said rule includes a searchbase component, and
said searchbase component corresponds to said user.

11. A method according to claim 10, wherein said user is represented by a user profile in a directory.

12. A method according to claim 11, wherein said determining whether said user satisfies said matching criteria comprises:
searching said directory using said rule.

13. A method according to claim 12, wherein said directory is searched using a LDAP search.

14. A method according to claim 11, wherein said directory employs LDAP.

15. A method according to claim 14, wherein:
said rule includes a scope component; and
said scope component corresponds to a base object scope.

16. A method according to claim 15, wherein said determining whether said user satisfies said matching criteria comprises:
searching said directory using said rule.

17. A method according to claim 11, wherein said directory is in communication with an Identity System.

18. A method according to claim 1, further comprising:
eliminating all dynamic groups in said test set from said set of dynamic groups, if it is determined that said user does not correspond to said test set.

19. A method according to claim 18, wherein said determining whether said user corresponds to a test set in said multiple test sets and said eliminating all dynamic groups in said test set from said set of dynamic groups are performed for each test set in said multiple test sets.

20. A method according to claim 1, further comprising:
removing from said test set all dynamic groups in said test set that do not correspond to said user, if it is determined that said user does correspond to said test set.

21. A method according to claim 20, wherein said removing from said test set all dynamic groups in said test set that do not correspond to said user comprises:
removing from said set of dynamic groups said all dynamic groups in said test set that do not correspond to said user.

22. A method according to claim 20, further comprising:
eliminating all dynamic groups in said test set from said set of dynamic groups, if it is determined that said user does not correspond to said test set.

23. A method according to claim 22, wherein said determining whether said user corresponds to a test set in said multiple test sets, said removing from said set of dynamic groups all dynamic groups in said test set that do not correspond to said user, and said eliminating all dynamic groups in said test set from said set of dynamic groups, are performed for each test set in said multiple test sets.

24. A method according to claim 1, wherein said determining whether said user corresponds to a test set in said multiple test sets comprises:
determining that all dynamic groups in said test set do not correspond to said user, based on a single directory search.

25. A method according to claim 1, wherein:
said method is performed as part of an Identity System.

26. A method according to claim 1, wherein:
said method is performed as part of an Access System.

27. A method according to claim 1, wherein:
said method is performed as part of an integrated Access System and Identity System.

28. A method according to claim 1, wherein determining whether said user corresponds to a test set in said multiple test sets is performed without accessing a directory server.

29. A method according to claim 28, wherein said determining whether said user corresponds to a test set in said multiple test sets is performed using a filter tester.

30. A method according to claim 1, wherein determining whether said user corresponds to a test set in said multiple test sets is performed using an SQL command.

31. One or more processor readable storage devices having processor readable code embodied on said one or more processor readable storage devices, said processor readable code for programming one or more processors and comprising:
    code for based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said user to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;
    code for selecting, by the computer system, a test set from the multiple test sets;
    code for storing an identification of each of said dynamic members of said at least one dynamic group, wherein said identification of each of said dynamic members is stored in said static member attribute for said identity profile of said at least one dynamic group;
    code for determining, by the computer system, whether said identity profile corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and
    code for removing, by the computer system, the selected test set from the multiple test sets in response to the said static member attributes within said identity profile not meeting the selected test set's filter requirements.

32. One or more processor readable storage devices according to claim 31, wherein said code for determining whether a user corresponds to a test set in said multiple test sets comprises:
    code for setting matching criteria for said test set; and
    code for determining whether said user satisfies said matching criteria.

33. One or more processor readable storage devices according to claim 32, wherein:
    said matching criteria is a rule including a filter component, and
    said filter component is satisfied if a filter for any dynamic group in said test set is satisfied.

34. One or more processor readable storage devices according to claim 33, wherein:
    said rule includes a searchbase component, and
    said searchbase component corresponds to said user.

35. One or more processor readable storage devices according to claim 34, wherein said user is represented by a user profile in a directory.

36. One or more processor readable storage devices according to claim 35, wherein said code for determining whether said user satisfies said matching criteria comprises:
    code for searching said directory using said rule.

37. One or more processor readable storage devices according to claim 36, wherein said code for searching said directory using said rule comprises code for searching using a LDAP search.

38. One or more processor readable storage devices according to claim 35, wherein:
    said rule includes a scope component, and
    said scope component corresponds to a base object scope.

39. One or more processor readable storage devices according to claim 38, wherein said code for determining whether said user satisfies said matching criteria comprises:
    code for searching said directory using said rule.

40. One or more processor readable storage devices according to claim 31, wherein said processor readable code further comprises:
    code for eliminating all dynamic groups in said test set from said set of dynamic groups, if it is determined that said user does not correspond to said test set.

41. One or more processor readable storage devices according to claim 40, wherein said processor readable code comprises, for each test set in said multiple test sets, code for determining whether said user corresponds to a test set in said multiple test sets and code for eliminating all dynamic groups in said test set from said set of dynamic groups.

42. One or more processor readable storage devices according to claim 31, wherein said processor readable code further comprises:
    code for removing from said test set all dynamic groups in said test set that do not correspond to said user, if it is determined that said user does correspond to said test set.

43. One or more processor readable storage devices according to claim 42, wherein said code for removing from said test set all dynamic groups in said test set that do not correspond to said user comprises:
    code for removing from said set of dynamic groups said all dynamic groups in said test set that do not correspond to said user.

44. One or more processor readable storage devices according to claim 31, wherein said code for determining whether a user corresponds to a test set in said multiple test sets comprises:
    code for determining that all dynamic groups in said test set do not correspond to said user, based on a single directory search.

45. One or more processor readable storage devices according to claim 31, wherein:
    said processor readable code is executable by an Identity System.

46. One or more processor readable storage devices according to claim 31, wherein:
    said processor readable code is executable by an Access System.

47. One or more processor readable storage devices according to claim 31, wherein:
    said processor readable code is executable by an integrated Access System and Identity System.

48. An apparatus, comprising:
    one or more storage devices; and
    one or more processors in communication with said one or more storage devices, said one or more storage devices comprising processor readable code for programming said one or more processors, said processor readable code comprising:
    code for based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said user to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;

code for selecting, by the computer system, a test set from the multiple test sets;

code for storing an identification of each of said dynamic members of said at least one dynamic group, wherein said identification of each of said dynamic members is stored in said static member attribute for said identity profile of said at least one dynamic group;

code for determining, by the computer system, whether said identity profile corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and code for removing, by the computer system, the selected test set from the multiple test sets in response to the said static member attributes within said identity profile not meeting the selected test set's filter requirements.

49. An apparatus according to claim 48, wherein said code for determining whether a user corresponds to a test set in said multiple test sets comprises:

code for setting matching criteria for said test set; and code for determining whether said user satisfies said matching criteria.

50. An apparatus according to claim 49, wherein:

said matching criteria is a rule including a filter component, and said filter component is satisfied if a filter for any dynamic group in said test set is satisfied.

51. An apparatus according to claim 50, wherein:

said rule includes a searchbase component, and said searchbase component corresponds to said user.

52. An apparatus according to claim 51, wherein said user is represented by a user profile in a directory.

53. An apparatus according to claim 52, wherein said code for determining whether said user satisfies said matching criteria comprises:

code for searching said directory using said rule.

54. An apparatus according to claim 52, wherein:

said rule includes a scope component; and said scope component corresponds to a base object scope.

55. An apparatus according to claim 54, wherein said code for determining whether said user satisfies said matching criteria comprises:

code for searching said directory using said rule.

56. An apparatus according to claim 48, wherein said processor readable code further comprises:

code for eliminating all dynamic groups in said test set from said set of dynamic groups, if it is determined that said user does not correspond to said test set.

57. An apparatus according to claim 48, wherein said processor readable code further comprises:

code for removing from said test set all dynamic groups in said test set that do not correspond to said user, if it is determined that said user does correspond to said test set; and code for eliminating all dynamic groups in said test set from said set of dynamic groups, if it is determined that said user does not correspond to said test set.

58. An apparatus according to claim 48, wherein said code for determining whether a user corresponds to a test set in said multiple test sets comprises:

code for determining that all dynamic groups in said test set do not correspond to said user, based on a single directory search.

59. An apparatus according to claim 48, wherein:

said processor readable code is executable by an Identity System.

60. An apparatus according to claim 48, wherein:

said processor readable code is executable by an Access System.

61. A method of identifying dynamic profiles corresponding to an entity, the method comprising:

based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said entity to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;

selecting, by the computer system, a test set from the multiple test sets;

storing an identification of each of said dynamic members of said at least one dynamic group, wherein said identification of each of said dynamic members is stored in said static member attribute for said identity profile of said at least one dynamic group;

determining, by the computer system, whether said identity profile corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and removing, by the computer system, the selected test set from the multiple test sets in response to the said static member attributes within said identity profile not meeting the selected test set's filter requirements.

62. A method according to claim 61, wherein said determining whether said entity corresponds to a test set in said multiple test sets comprises:

setting matching criteria for said test set; and determining whether said entity satisfies said matching criteria.

63. A method according to claim 62, wherein said matching criteria is satisfied if a filter for any dynamic profile in said test set is satisfied.

64. A method according to claim 62, wherein:

said matching criteria is a rule including a filter component, and said filter component is satisfied if any filter from a dynamic group in said test set is satisfied.

65. A method according to claim 64, wherein:
said rule includes a searchbase component;
said searchbase component corresponds to said entity;
said rule includes a scope component; and
said scope component corresponds to a base object scope.

66. A method according to claim 65, wherein said entity is represented by a profile in a directory, wherein said determining whether said entity satisfies said matching criteria comprises:
code for searching said directory using said rule.

67. A method according to claim 61, wherein said entity is represented by a user profile and said set of dynamic profiles includes dynamic group profiles.

68. A method according to claim 61, further comprising:
eliminating all dynamic profiles in said test set from said set of dynamic profiles, if it is determined that said entity does not correspond to said test set.

69. A method according to claim 61, wherein said determining whether said entity corresponds to a test set in said multiple test sets comprises:
determining that all dynamic profiles in said test set do not correspond to said entity, based on a single directory search.

70. One or more processor readable storage devices having processor readable code embodied on said one or more processor readable storage devices, said processor readable code for programming one or more processors and comprising:
code for based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said entity to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;
code for selecting, by the computer system, a test set from the multiple test sets;
code for storing an identification of each of said dynamic members of said at least one dynamic group, wherein said identification of each of said dynamic members is stored in said static member attribute for said identity profile of said at least one dynamic group;
code for determining, by the computer system, whether said identity profile corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and
code for removing, by the computer system, the selected test set from the multiple test sets in response to the said static member attributes within said identity profile not meeting the selected test set's filter requirements.

71. One or more processor readable storage devices according to claim 70, wherein said code for determining whether said entity corresponds to a test set in said multiple test sets comprises:
code for setting matching criteria for said test set; and
code for determining whether said entity satisfies said matching criteria, wherein said matching criteria is satisfied if a filter for any dynamic profile in said test set is satisfied.

72. One or more processor readable storage devices according to claim 71, wherein:
said matching criteria is a rule;
said rule includes a filter component;
said filter component is satisfied if a filter for any dynamic profile in said test set is satisfied;
said rule includes a searchbase component;
said searchbase component corresponds to said entity;
said rule includes a scope component; and
said scope component corresponds to a base object scope.

73. One or more processor readable storage devices according to claim 72, wherein said entity is represented by a profile in a directory, wherein said code for determining whether said entity satisfies said matching criteria comprises:
code for searching said directory using said rule.

74. One or more processor readable storage devices according to claim 70, wherein said processor readable code further comprises:
code for eliminating all dynamic profiles in said test set from said set of dynamic profiles, if it is determined that said entity does not correspond to said test set.

75. One or more processor readable storage devices according to claim 70, wherein said code for determining whether said entity corresponds to a test set in said multiple test sets comprises:
code for determining that all dynamic profiles in said test set do not correspond to said entity, based on a single directory search.

76. An apparatus, comprising:
one or more storage devices; and
one or more processors in communication with said one or more storage devices, said one or more storage devices comprising processor readable code for programming said one or more processors, said processor readable code comprising:
code for based on a rule that defines dynamic membership, partitioning, by a computer system, a set of dynamic groups including dynamic members, into multiple test sets, wherein each test set in said multiple test sets includes at least one dynamic group from said set of dynamic groups and wherein said set of dynamic groups are configured to have the potential for said entity to be a member, wherein said rule is stored in a dynamic rule attribute of an identity profile of said at least one dynamic group, and wherein said at least one dynamic group includes one or more static members and an identification of each of said static members is stored in a static member attribute for said identity profile of said at least one dynamic group;
code for selecting, by the computer system, a test set from the multiple test sets;
code for storing an identification of each of said dynamic members of said at least one dynamic group, wherein said identification of each of said dynamic members is stored in said static member attribute for said identity profile of said at least one dynamic group;
code for determining, by the computer system, whether said identity profile entity corresponds to the selected test set in said multiple test sets, wherein said test set includes multiple dynamic groups from said set of dynamic groups, wherein the determination of correspondence includes determining if said static member attributes within said identity profile meet the selected test set's filter requirements; and code for removing, by the computer system, the selected test set from the multiple test sets in response to the said static member attributes within said identity profile not meeting the selected test set's filter requirements.

* * * * *

UNITED STATES PATENT AND TRADEMARK OFFICE
CERTIFICATE OF CORRECTION

| | |
|---|---|
| PATENT NO. | : 7,613,794 B2 |
| APPLICATION NO. | : 11/684796 |
| DATED | : November 3, 2009 |
| INVENTOR(S) | : Shawn P. Delaney et al. |

It is certified that error appears in the above-identified patent and that said Letters Patent is hereby corrected as shown below:

On the Title Pg Item (56) on page 3, under "Other Publications", line 5, delete "Usuable" and insert -- Usable --, therefor.

On the Title Pg Item (56) on page 3, under "Other Publications", line 38, delete "10/325,456," and insert -- 10/325,465, --, therefor.

In column 8, line 21, after "object" insert -- . --.

In column 24, line 65, in claim 76, after "profile" delete "entity".

Signed and Sealed this

Fourteenth Day of September, 2010

David J. Kappos
*Director of the United States Patent and Trademark Office*